J. MULVEHILL.
DEVICE FOR OPERATING CORN PLANTER MARKERS.
APPLICATION FILED JUNE 17, 1911.
1,018,581.
Patented Feb. 27, 1912.
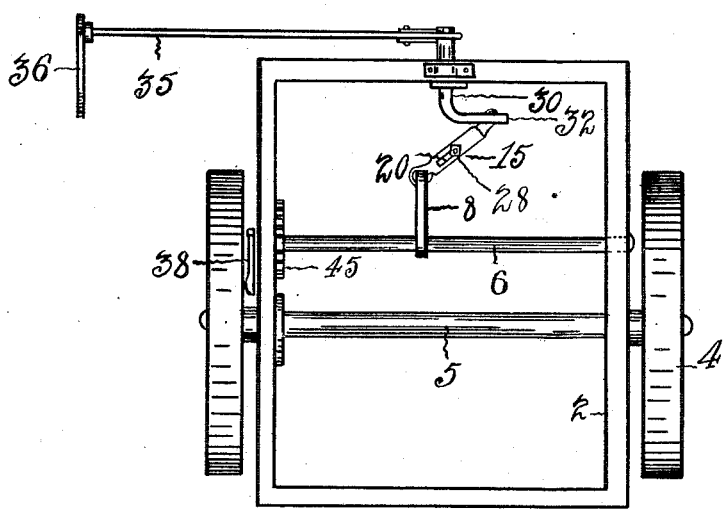
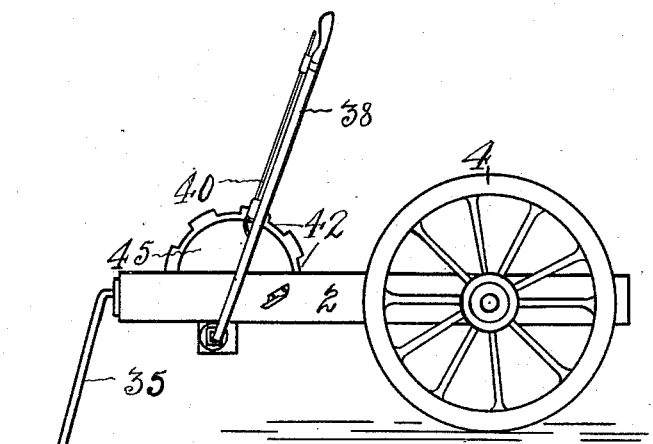
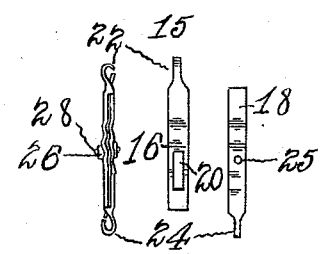
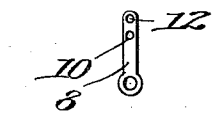
Witnesses
Inventor
James Mulvehill
By M. M. Cady
Attorney

UNITED STATES PATENT OFFICE.

JAMES MULVEHILL, OF DUBUQUE, IOWA.

DEVICE FOR OPERATING CORN-PLANTER MARKERS.

1,018,581.  Specification of Letters Patent.  Patented Feb. 27, 1912.

Application filed June 17, 1911. Serial No. 633,895.

*To all whom it may concern:*

Be it known that I, JAMES MULVEHILL, citizen of the United States, residing at Dubuque, in the county of Dubuque and State of Iowa, have invented certain new and useful Improvements in Devices for Operating Corn-Planter Markers, of which the following is a specification.

My invention has for its object to provide a device for operating a marker for corn planters that can be readily attached to any planter without any material change and adjusted to meet different conditions of attachment and adapted to be successfully used in different conditions of soil.

In what it consists, its mode of construction and manner of use will be fully and in detail developed and illustrated in the following specification and drawings accompanying the same and forming a part hereof.

Figure 1 is a plan view with the device attached to a planter frame. Fig. 2 is a side view. Fig. 3 represents detail views of the connecting member. Fig. 4 is a plan view of the arm attached to the shaft.

Like characters of reference denote corresponding parts in each of the drawings.

In the drawings 2 designates a planter frame, 4 the wheels and 5 the axle. Near the rear end of the frame is journaled a shaft 6 to which is rigidly secured near the middle of the shaft an arm 8 which is provided with two openings 10 and 12. In the opening 12 is engaged one end of the connecting member 15. The connecting member 15 is formed in two parts 16 and 18. The part 16 is formed of a flat-piece of steel corrugated with the corrugations running cross wise of said part and provided with a slot 20 near one end and terminating in a hook 22 adapted to be closed when engaging the arm 8 at the other end. The part 18 is also corrugated cross wise and is provided with a closable hook 24 at the opposite end from the end on which the hook 22 is upon the part 16 and when the two are bolted together to form the member 15 there will be a closable hook 24 at each end. The part 18 is also provided with an opening 25 in which is inserted a bolt 26 and a nut 28 by which bolt the two parts 16 and 18 are bolted together through the opening 25 and the slot 20 and held adjustable by the nut 28.

On the frame is journaled a crank 30 which is bent at an angle and in the end 32 is an opening in which the hook 22 of the member 15 engages and the hook 24 of said member 15 engages the opening 12 in the arm 8 and loosely connects the crank 30 with the arm 8, but the hooks being closed will not permit any disengagement of the member from the crank and arm. To the other end of the crank 30 is secured the marker arm 35 having attached to its outer end the marker 36.

For the purpose of throwing the marker from one side to the other when the planter is turned at the end of a row, there is rigidly attached to the shaft 6 a lever 38 carrying with it a dog 40 adapted to engage notches 42 in a sector plate 45 attached to the frame.

In operating my device the operator grasps the lever 38 and gives it a quick pull and lets go his hold of it. This will rotate the shaft 6 turning down the arm 8 which draws with it the connecting member 15 and rotates the crank 30 and as the marker arm is attached to the crank the arm will be immediately thrown past the center and by its own gravity drop down on the opposite side of the planter. If the operator is about to take the planter from the field then he will bring the lever 38 into about a perpendicular position and the dog 40 into engagement with one of the notches 42 in the sector plate and it will hold the marker arm in a perpendicular position. If the ground be dry and hard then the operator brings the lever 38 down to near the plane of the frame of the planter and this action will force up the arm 8 and as the connecting member 8 is a rigid piece will crowd the end 32 of the crank up and this will force the marker 36 down into the ground. If he desires to exert a greater or less force on the marker arm or make the throw more rapid then he releases the nut 28 and withdraws the bolt 26 and lengthens or shortens the member 15 in the slot 20 and also may hook the member 15 into the opening 10 in the arm. In this manner of loosely connecting the crank by the member 15 with the shaft 6 through the arm 8 there is obtained a quick response to the operation of the lever 38 and still the attaching hooks will provide sufficient yielding to prevent breaking. Also the operator can so adjust the member 15 as to adapt the marker to mark whether the ground be dry and hard, dry and light, or wet and soft.

Having now described my invention what I claim and desire to secure by Letters Patent is:

1. In a device of the character described, a shaft journaled in the frame, a lever for rotating the shaft, an arm rigidly secured to said shaft, a crank journaled in the frame, a marker arm carrying a marker secured to the crank, and a rigid member adjustable in length loosely connected at one end to the crank and the other end loosely connected to the arm on the shaft.

2. In a device of the character described a shaft journaled in the frame, a lever for rotating the shaft, an arm rigidly secured to said shaft, a crank journaled in the frame, a marker arm carrying a marker rigidly secured to the crank, outside of the frame, a member formed in two parts and loosely connecting said crank with the arm on the shaft, and means for adjustably holding the two parts of the member together.

3. In a device of the character described, a shaft journaled in the frame, a lever for rotating the shaft, an arm rigidly secured to said shaft, a crank journaled in the frame, a marker arm carrying a marker rigidly secured to the crank, a rigid member loosely connected to the crank, and means provided by the arm on the shaft by which the member is loosely and adjustably connected to the arm on the shaft.

4. In a device of the character described, a shaft journaled in the frame, a lever attached to the shaft for rotating the shaft, a sector-plate secured to the frame, a dog attached to the lever and adapted to engage the sector-plate, an arm secured to said shaft and provided with openings therethrough, a crank journaled in the frame, a marker arm carrying a marker secured to said crank, a member composed of two parts each part provided with a hook, one hook attached to the crank and the other attached to one of the openings in the arm, and means for holding the parts of the member in adjusted position.

5. In a device of the character described, a shaft journaled in the frame, a lever for rotating said shaft, an arm secured to said shaft and provided with openings, a crank journaled in the frame, a marker arm rigidly attached to one end of the crank and carrying a marker, a connecting member loosely attached to the crank arm, means for loosely connecting said member to one of the openings in said arm upon the shaft, and means for adjusting the length of said member.

6. In a device of the character described, a shaft journaled in the frame, a lever for rotating said shaft, a sector-plate secured to the frame; a dog attached to the lever and adapted to engage the sector-plate, an arm secured to said shaft and provided with openings, a crank journaled in the frame, a marker arm rigidly attached to one end of the crank and carrying a marker, a connecting member composed of two parts adjustably united together, and means for loosely attaching said member to the crank and to said arm upon the shaft.

In testimony whereof I affix my signature in presence of two witnesses.

JAMES MULVEHILL.

Witnesses:
M. M. CADY,
LEE T. HYLAND.

---

Copies of this patent may be obtained for five cents each, by addressing the "Commissioner of Patents, Washington, D. C."